(12) United States Patent
Dennison

(10) Patent No.: US 11,041,440 B2
(45) Date of Patent: Jun. 22, 2021

(54) FUEL FLOW VALVE

(71) Applicant: ROLLS-ROYCE plc, London (GB)

(72) Inventor: Stephen G. Dennison, Derby (GB)

(73) Assignee: ROLLS-ROYCE plc, London (GB)

( * ) Notice: Subject to any disclaimer, the term of this patent is extended or adjusted under 35 U.S.C. 154(b) by 328 days.

(21) Appl. No.: 16/244,188

(22) Filed: Jan. 10, 2019

(65) Prior Publication Data

US 2019/0242302 A1  Aug. 8, 2019

(30) Foreign Application Priority Data

Feb. 2, 2018 (GB) ..................................... 1801704

(51) Int. Cl.
*F02C 7/232* (2006.01)
*F16K 31/06* (2006.01)

(52) U.S. Cl.
CPC .......... *F02C 7/232* (2013.01); *F16K 31/0634* (2013.01)

(58) Field of Classification Search
CPC .. F02C 7/232; F02C 9/263; F02C 9/26; F02C 7/264; F02C 3/343; F16K 27/029; F16K 31/02; F16K 31/06; F16K 31/0603; F16K 31/0606; F16K 31/0679; F16K 31/0634
See application file for complete search history.

(56) References Cited

U.S. PATENT DOCUMENTS

| 2,880,713 A | 4/1959 | Hudspeth et al. |
| 4,337,616 A | 7/1982 | Downing |
| 4,714,300 A | 12/1987 | Heess et al. |
| 5,881,550 A | 3/1999 | Toelle |
| 6,170,524 B1 * | 1/2001 | Gray, Jr. .............. F02M 59/466 137/625.18 |

(Continued)

FOREIGN PATENT DOCUMENTS

| EP | 2063087 | 12/2012 |
| EP | 2236924 | 1/2014 |

(Continued)

OTHER PUBLICATIONS

Response to the Extended European Search Report from counterpart EP Application No. 19150232.7 dated Jun. 17, 2019, filed Feb. 5, 2020, 32 pgs.

(Continued)

*Primary Examiner* — Gerald L Sung
(74) *Attorney, Agent, or Firm* — Shumaker & Sieffert, P.A.

(57) ABSTRACT

A fuel flow valve, for example for use in supplying fuel to a gas turbine engine. Example embodiments disclosed include a staging fuel valve (300), comprising: a valve housing (301) having first and second fuel inlets (306, 307) and first and second fuel outlets (305, 308); a piston (302) slidably mounted within a chamber (303) in the valve housing (301) and being moveable between a first position in which the first inlet (306) is in fluid communication with the first outlet (305) while the second inlet (307) and second outlet (308) are blocked, and a second position in which the second inlet (307) is in fluid communication with the second outlet (308). The piston (302) comprises a magnet assembly (312) and the valve housing (301) comprises a coil (313) arranged to provide, when energised, a magnetic force to actuate the piston (302) between the first and second positions.

11 Claims, 3 Drawing Sheets

(56) References Cited

U.S. PATENT DOCUMENTS

| | | | |
|---|---|---|---|
| 6,460,557 B1 * | 10/2002 | Levitan | F15B 13/0402 |
| | | | 137/1 |
| 8,739,544 B2 | 6/2014 | Rawlinson et al. | |
| 8,887,752 B2 * | 11/2014 | Rawlinson | F02C 9/34 |
| | | | 137/98 |
| 9,408,477 B1 * | 8/2016 | Robinson | A47C 27/082 |
| 2005/0046531 A1 * | 3/2005 | Moyer | F16K 31/082 |
| | | | 335/256 |
| 2005/0217269 A1 | 10/2005 | Myers, Jr. et al. | |
| 2005/0284149 A1 | 12/2005 | Jansen et al. | |
| 2008/0245074 A1 * | 10/2008 | Oda | F23K 5/06 |
| | | | 60/737 |
| 2009/0126802 A1 | 5/2009 | Rawlinson | |
| 2013/0042920 A1 | 2/2013 | Snodgrass et al. | |
| 2014/0261717 A1 * | 9/2014 | Egley | F16K 31/0627 |
| | | | 137/12 |
| 2015/0014558 A1 * | 1/2015 | Lanigan | F16K 31/003 |
| | | | 251/129.09 |
| 2017/0016401 A1 | 1/2017 | Stockwell | |

FOREIGN PATENT DOCUMENTS

| | | |
|---|---|---|
| GB | 2305975 | 4/1997 |
| WO | 2018002511 | 1/2018 |

OTHER PUBLICATIONS

Great Britain search report dated Jul. 12, 2018, issued in GB Patent Application No. 1801704.6.
European search report dated Jun. 17, 2019, issued in EP Patent Application No. 19150232.

* cited by examiner

FUEL FLOW VALVE

CROSS-REFERENCE TO RELATED APPLICATIONS

This specification is based upon and claims the benefit of priority from United Kingdom Patent Application Number GB 1801704.6 filed on Feb. 2, 2018, the entire contents of which are incorporated herein by reference.

BACKGROUND

Technical Field

The present disclosure concerns a fuel flow valve, for example for use in supplying fuel to a gas turbine engine.

Description of the Related Art

In some fuel systems, for example used in supplying fuel to a combustor in a gas turbine engine, it is necessary to switch between a pilot fuel flow and a main fuel flow that is supplied to fuel spray nozzles. The switching point may vary by design, but in many cases the pressure available for actuating each valve at the switching point is low, which can result in difficulties in designing a reasonably sized valve that can be actuated by the change in fuel supply pressure alone, and can result in valves becoming stuck, resulting in incorrect fuel scheduling. Additional actuation may be provided, for example using an electric motor, to address this issue, but makes the fuel flow valve more complicated and larger. In one example, as disclosed in U.S. Pat. No. 8,739,544, a complex stepper motor-driven pilot/main flow valve arrangement allows for control of fuel flow to a burner head. In other examples, integrated electromagnetic valves may be used in other industries. One example is in U.S. Pat. No. 4,714,300, which discloses a valve device used in an automotive system. Other arrangements may involve latching valves, but a risk with such valves, particularly when used in high temperature environments, is sticking of the valve in the closed or open position due to fuel lacquering. The use of electromagnetic actuation, as for example provided by integrating a stepper motor, adds complication to the valve and may be problematic in high temperature environments such as close to a burner head of a gas turbine engine combustor.

SUMMARY

According to a first aspect there is provided a staging fuel valve, comprising:
  a valve housing having first and second fuel inlets and first and second fuel outlets;
  a piston slidably mounted within a chamber in the valve housing and being moveable between a first position in which the first inlet is in fluid communication with the first outlet while the second inlet and second outlet are blocked, and a second position in which the second inlet is in fluid communication with the second outlet;
  wherein the piston comprises a magnet assembly and the valve housing comprises a coil arranged to provide, when energised, a magnetic force to actuate the piston between the first and second positions.

This staging valve arrangement allows for fuel to be provided through first and second inlets, which may be pilot and main fuel inputs respectively, using a simple valve actuation arrangement compared with some existing staging fuel valves. It also allows for electromagnetic augmentation of an otherwise hydraulically latched valve, which addresses the problems of sticking in the first or second position. Using permanent magnets embedded in the piston may also assist in holding the piston in either the first or second positions without the need for additional force. The piston should magnetically attach to the (preferably ferritic steel) housing in the first or second position, which allows the current to be reduced or removed once the piston is in either position. Moreover, when the field current in the coil is reversed, the magnets will tend to repel the steel body and thereby assisting movement of the piston.

The first inlet may be in fluid communication with the first outlet when the piston is in the second position. In this arrangement, the pilot fuel flow through the first inlet may continue while the main fuel flow passes through the second inlet.

The piston may comprise a tapered head section arranged to align with the second inlet when the piston is partially actuated between the first and second position such that a pressure of the fuel flow from the second inlet to the second outlet tends to cause the piston to further actuate towards the second position. This feature assists the piston to latch towards the second position due to the pressure from the fuel at the second inlet. The fuel pressure at the second inlet may therefore be used to provide a portion of the actuation force to move the piston towards the second position.

The head section of the piston may for example comprise a conical, or frusto-conical, shape. This type of shape provides an actuation force tending to move the piston towards the second position when a portion of the tapered head section is exposed to fuel flow from the second inlet.

The staging fuel valve may comprise a controller having output connections connected across the coil and configured to provide a current through the coil to actuate the piston in response to an input signal.

The controller may be configured to provide a current pulse in response to an input signal to actuate the piston from the first to the second position. A current pulse, rather than a continuous actuation current, may be all that is required to actuate the piston from the first to the second positions, since the pressure from the main fuel flow at the second inlet may be sufficient to keep the piston actuated in the second position.

The controller may be configured to provide a continuous current through the coil to maintain the piston in the second position. This may be preferable when there are fluctuations in the pressure of fuel applied to the second inlet, so that the piston is kept at the second position if the fuel pressure drops momentarily.

In accordance with a second aspect there is provided a method of operating a staging fuel valve according to the first aspect, the method comprising the sequential steps of:
  providing a first fuel flow at a first pressure to the first input with the piston in the first position;
  providing fuel at a second pressure higher than the first pressure to the second input; and
  actuating the piston to move the piston from the first position to the second position.

The step of actuating the piston may comprise applying an actuation current through the coil to provide a force to actuate the piston towards the second position.

The step of applying an actuation current may comprise applying a current pulse through the coil.

The method may comprise the subsequent step of applying a maintaining current, lower in magnitude than the actuation current, to maintain the piston in the second position after actuation of the piston to the second position.

The skilled person will appreciate that, except where mutually exclusive, a feature described in relation to any one of the above aspects may be applied mutatis mutandis to any other aspect. Furthermore, except where mutually exclusive, any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 1:
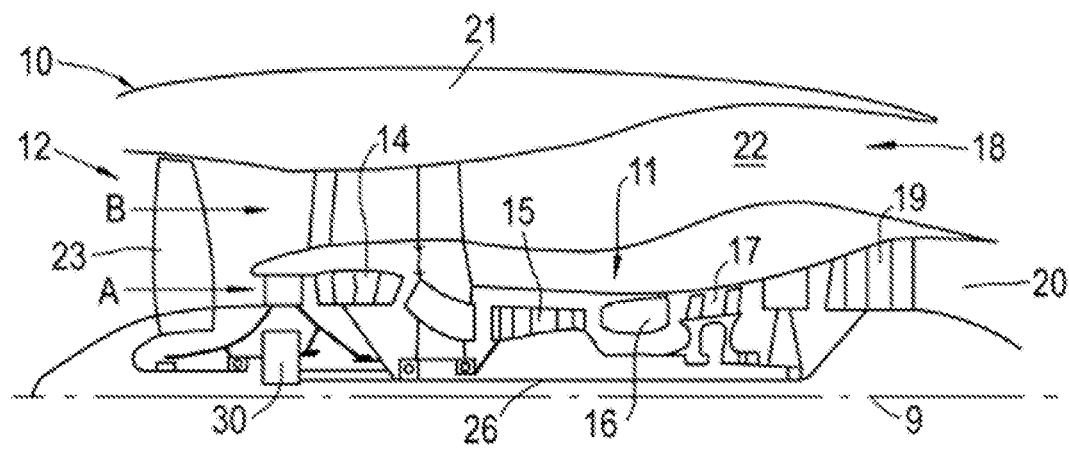
FIG. 1 is a sectional side view of a gas turbine engine.

Referring to FIG. 1, a two-shaft gas turbine engine 10 has a principal rotational axis 9. The engine 10 comprises an air intake 12 and a propulsive fan 23 that generates two airflows A and B. The gas turbine engine 10 comprises a core engine 11 having, in axial flow A, a low pressure booster compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines, in axial flow B, a bypass duct 22 and a bypass exhaust nozzle 18. The fan 23 is attached to and driven by the low pressure turbine 19 via shaft 26 and epicyclic gearbox 30.

The gas turbine engine 10 works in a conventional manner so that air in the core airflow A is accelerated and compressed by the high pressure booster compressor 14 and directed into the high pressure compressor 15 where further compression takes place. The compressed air exhausted from the high pressure compressor 15 is directed into the combustion equipment 16 where it is mixed with fuel and the mixture combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft. The fan 23 normally provides the majority of the propulsive thrust. The epicyclic gearbox 30 is a reduction gearbox.

Figure 2:
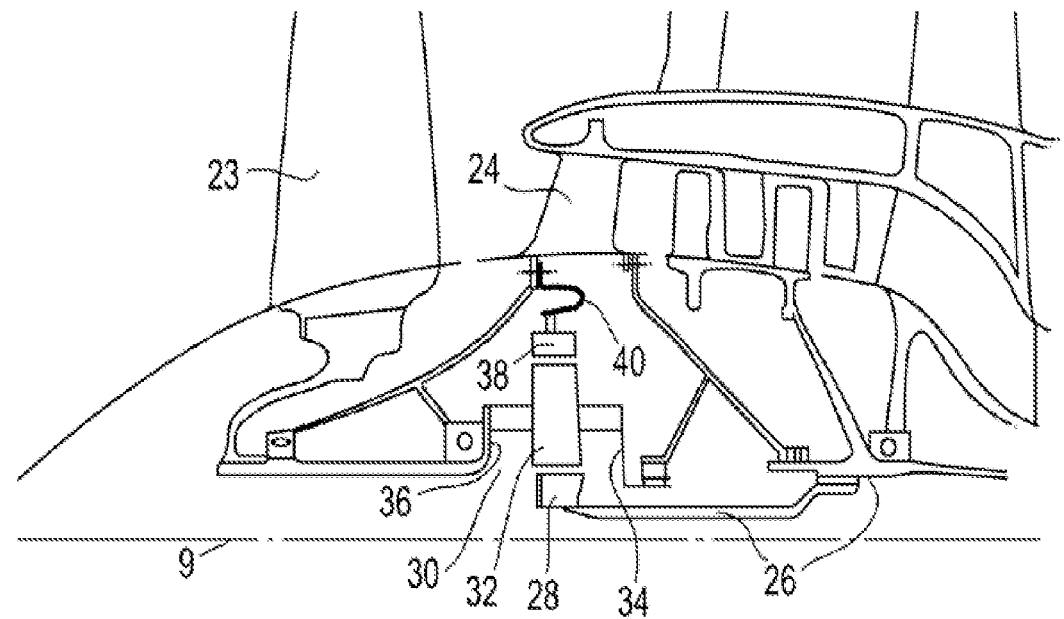
FIG. 2 is a further sectional view of a forward section of a gas turbine engine.

A known mechanical arrangement for a two-shaft geared fan gas turbine engine 10 is shown in FIG. 2. The low pressure turbine 19 (FIG. 1) drives the shaft 26, which is coupled to a sun wheel, or sun gear, 28 of the epicyclic gear arrangement 30. Radially outwardly of the sun gear 28 and intermeshing therewith, in conventional manner, is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis independently. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to stationary structure 24.

The epicyclic gearbox 30 is of the planetary type, in that the planet carrier 34 rotates about the sun gear 28 and is coupled to an output shaft, linkages 36. In other applications the gearbox 30 may be a differential gearbox in which the ring gear 38 also rotates in the opposite sense and is coupled to a different output shaft via linkages 40.

Figure 3A:
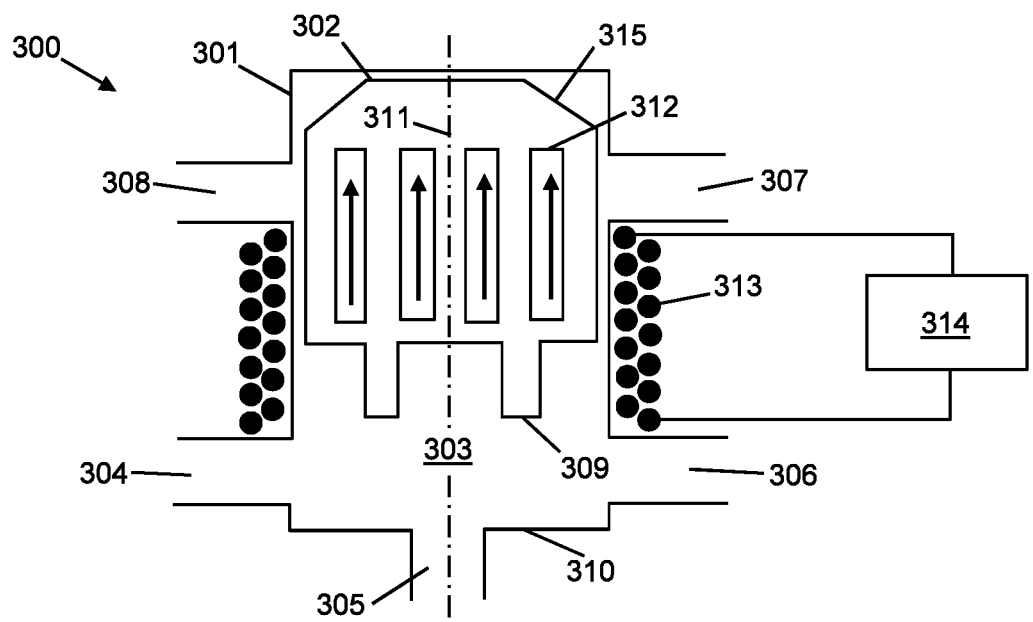
FIG. 3A is a schematic sectional view of an example staging fuel valve with the piston in a first position.
Figure 3B:
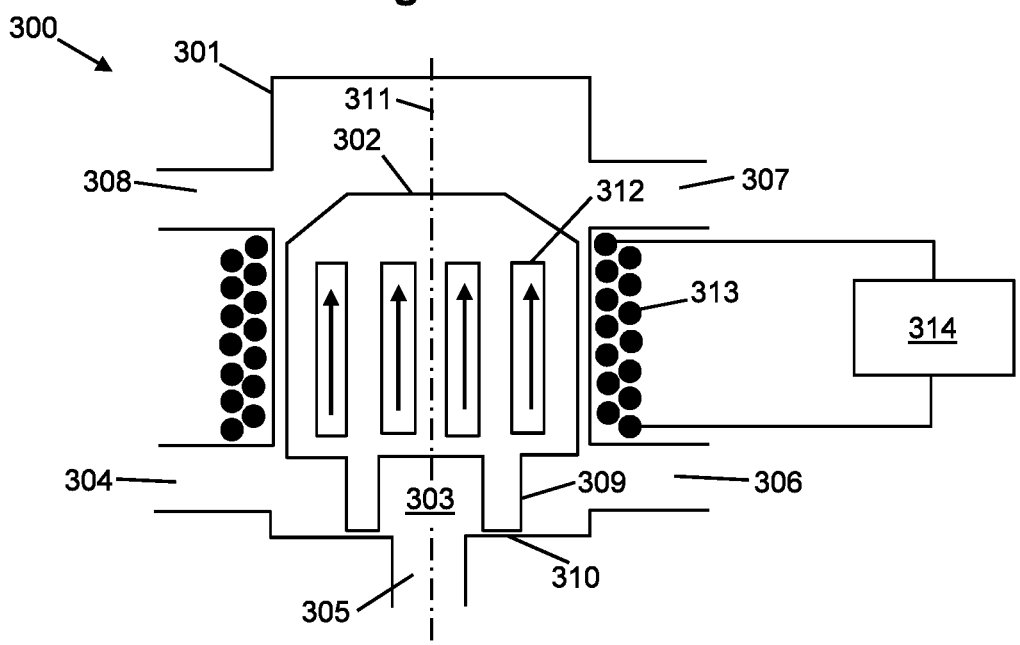
FIG. 3B is a schematic sectional view of the example staging fuel valve of FIG. 3A with the piston in a second position.

FIGS. 3A and 3B show an example of a staging fuel valve 300, which comprises a valve housing 301 and a piston 302 slidably mounted within a cylindrical chamber 303 in the valve housing 301. The fuel valve 300 comprises a first, or pilot, fuel inlet 304 and a first, or pilot, fuel outlet 305. A further pilot fuel inlet 306 may also be provided. The fuel valve 300 also comprises a second, or main, fuel inlet 307 and a second, or main, fuel outlet 308.

The piston 302 is moveable between a first position, shown in FIG. 3A, and a second position, shown in FIG. 3B. In the first position, the piston 302 allows fuel to flow from the pilot fuel inlet(s) 304, 306 to the pilot fuel outlet 305, and blocks fuel flow from the main fuel inlet 307 to the main fuel outlet 308. In the second position, the piston 302 allows fuel flow from the main fuel inlet 307 to the main fuel outlet 308. In this second position, fuel may continue to flow from the pilot fuel inlet(s) 304, 306 to the pilot fuel outlet 305. In the illustrated example, the piston 302 comprises an extension 309 that prevents the piston from blocking the pilot fuel inlet and/or outlet when the piston 302 is in the second position. The extension 309 may for example comprise one or more legs that maintain a standoff position between the piston 302 and an end 310 of the chamber 303 when the piston 302 is in the second position, which allows fuel to flow between the pilot inlet(s) 304, 306 and outlet 305.

The piston 302 may be a sliding fit within the cylindrical chamber 303, forming a fluid seal between the first and second inlets and outlets, and effectively blocking fluid from flowing between the second inlet and outlet 307, 308 when in the first position. Sealing features such as piston rings may be provided to form an effective seal with the chamber walls. The piston 302 and the chamber 303 may both be circular cylindrical in section.

The piston 302 comprises a magnet assembly 312 which, in the example shown in FIGS. 3A and 3B, comprises a plurality of magnetic elements distributed around the piston 302, with each element having a magnetic axis aligned in parallel with a longitudinal axis 311 of the piston, which defines the direction along which the piston 302 moves when actuating between the first and second positions. The valve housing 301 comprises an electrically conductive coil 313 wound around the valve housing 301 and having an axis parallel to the longitudinal axis 311 of the piston. The coil 313 is connected to a controller 314, which is configured to provide a current through the coil 313 in response to an input signal. The current energises the coil 313 and creates a magnetic field within the valve housing that will either tend to provide a force to move the piston from the first to the second position or vice versa, depending on the direction of current through the coil 313.

The piston 302 comprises a tapered head section 315, which is arranged to align with the main fuel inlet 307 when the piston 302 is partially actuated between the first and second positions such that a pressure of the fuel flow from the second inlet 307 will tend to cause the piston 302 to further actuate towards the second position. Once the piston 302 has moved partway from the first to the second position, the pressure of fuel at the main fuel inlet 307 may be sufficient to latch the piston 302 towards the second position. The piston will then stay at the second position until the fuel pressure in the main fuel inlet 307 drops below the pressure at the pilot fuel inlet 306. To assist movement of the piston 302 from the first to the second positions, the tapered head section 315 may take the form of a conical, or frusto-conical, shape.

Figure 4:
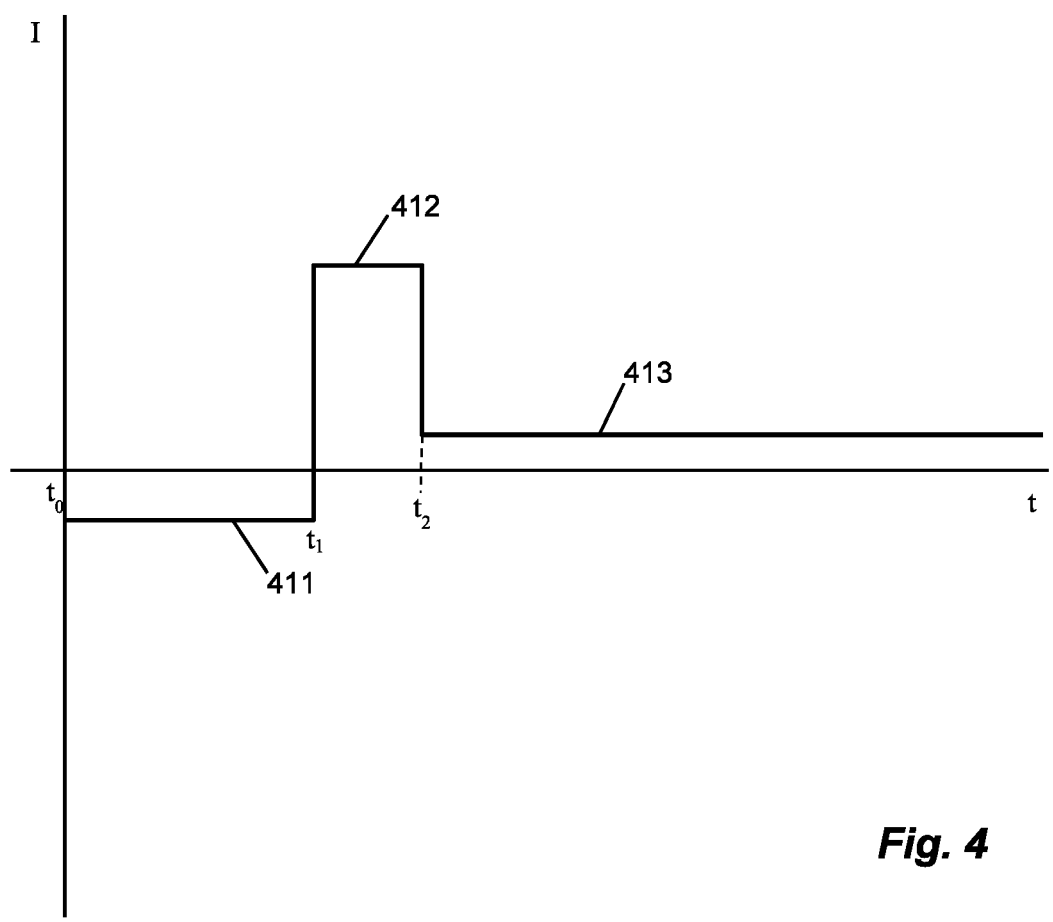
FIG. 4 is a schematic diagram of current as a function of time during actuation of the fuel valve.

Since the piston 302 will tend to latch in either of the first or second positions, depending on the difference in pressure between the pilot and main fuel inlets 306, 307, all that may be required to actuate the piston is a pulse of current through the coil 313 to create a momentary force on the piston 302. Once the piston 302 has moved to its new position, the controller 314 may continue supplying a smaller current to maintain the piston 302 at that position, in case the pressure difference between the pilot and main fuel inlets 306, 307 fluctuates and falls below a level sufficient to maintain the piston at the desired position. FIG. 4 illustrates schematically an example current profile as a function of time, showing how current through the coil may vary once a pressure of the main fuel supply has been activated, at time $t_0$. The pressure of the main fuel supply alone will not cause the valve to actuate, as the pressure at the main fuel inlet 307 when the piston 302 is in the first position does not have a component in the direction of the longitudinal axis 311. Until a signal to actuate the valve has been received by the controller 314, the piston 302 is maintained in the first position by a small negative current flow 411. Once a signal is received to actuate the piston 302, at time $t_1$, the controller 314 switches the current to a larger positive current flow 412, which causes the piston 302 to begin moving towards the second position. The current may then be reduced to a smaller positive value 413 once the piston 302 has moved to the second position, or at least has moved a sufficient part of the way for the main fuel flow pressure to provide sufficient force to move the piston 302 the rest of the way, and to keep the piston 320 at the second position. The current is then reduced, at time $t_2$, to a lower positive level and maintained at that level while the valve 300 is in the second position. When the valve 300 is to be actuated to return the piston 302 to the first position, the main fuel supply pressure is cut off and a large negative current pulse is provided to the coil 313, causing the piston 302 to move towards the first position. A smaller negative current may then be maintained to keep the piston 302 at the first position. The current profile will therefore be the opposite of that shown in FIG. 4. The positive and negative current values in the example illustrated in FIG. 4 may be reversed, depending on the arrangement of the coil 313 and magnet assembly 312.

In a gas turbine engine, electrical current to the coil 313 may be supply from a dedicated FADEC (Full Authority Digital Engine Control) electrical power supply, via a conventional electronic circuit drive in the Electronic Engine Control (EEC) unit of the engine.

The electromagnetically augmented actuator described herein may be applied to a number of different types of valve constructions. The number, magnitude and orientation of the permanent magnets in the piston 302 and the coil windings around the valve housing may be adjusted to suit a particular application, depending on the force and latching requirements for the particular fuel system.

In some cases it may be desirable to incorporate a biasing mechanism into the valve design, for example to provide balancing of the valve or an additional latching force. The piston 302 may for example be biased towards either the first or second positions, depending on the application. A biasing spring may be provided between the piston 302 and an end of the chamber 303 to serve this purpose. As an example, a wire wound compression spring, preferably made from a corrosion resistant steel such as AMS5678, may be mounted in a hole or recess in the top or bottom of the piston 302.

A sealing arrangement may be incorporated into the valve 300 to prevent leakage of fuel from the main fuel supply inlet to the main fuel supply outlet, which could otherwise result in lacquering or coking of the main fuel supply in the fuel spray nozzle. This sealing may alternatively be provided by check valves incorporated into the design of the fuel spray nozzle housing. In some arrangements, the seal provided by a tight tolerance between the piston and the housing may be sufficient. In other arrangements, a reciprocating coil spring seal, for example of the type available from Bal Seal Engineering, Inc., may be used to fit the piston 302 in the housing 301.

Further, there may be a need to incorporate dynamic sealing into the design of the valve piston 302 to prevent the leakage of fuel from the main fuel supply inlet to the pilot inlet and outlet when the system is in a pilot only mode of operation. Again, this sealing functionality could be provided by conventional check valves located in the respective feed lines of the fuel spray nozzles. Alternatively, an upstream metering/staging unit could be designed to accommodate a certain level of leakage from the mains line to the pilot line in all modes of operation, thus negating the need for a dynamic sealing arrangement in the design of the valve piston.

Further, with the integration of suitable position sensing into the design of each valve, for example using ultrasonic linear position sensing, a level of modulation could be applied in the control of the valve, providing the capability to actively mitigate any adverse fuel flow distribution around the combustor as well as enabling the implementation of circumferential staging. An ultrasonic sensor could be mounted in an end of the housing 301 but would need the housing to be filled with fuel to be able to transmit a signal that is then reflected off the end of the piston. Closed loop control could alternatively be achieved by measuring the differential pressure across the valve 300 and closing the loop around the differential pressure as a function of valve movement.

The valve 300 described herein could be applied to advanced (staged) rich-burn fuel system architectures as well as lean-burn (staging) architectures. It is envisaged that a staged rich-burn system could take the form of fuel flow dividing functionality located upstream of the valves, which would be located near to, or integrated within, the corresponding fuel spray nozzles.

Figure 5:
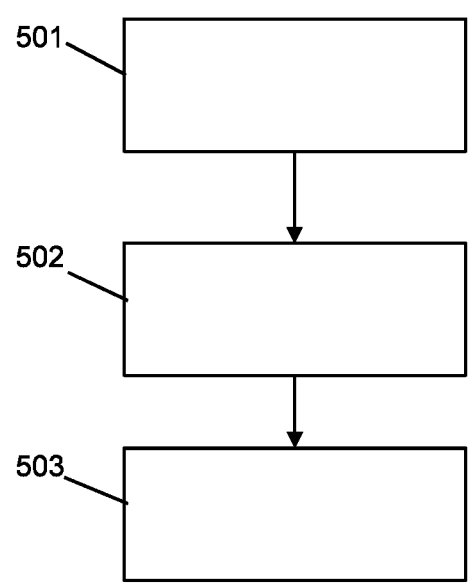
FIG. 5 is a schematic flow diagram illustrating an example method of operating a staging fuel valve.

FIG. 5 illustrates an example method of operating a staging fuel valve of the type described herein. In a first step 501 a fuel flow, i.e. a pilot fuel flow, at a first pressure is provided to the first input 304, with the piston 302 in the first position. In a second step 502, fuel at a second pressure higher than the first pressure, i.e. the main fuel flow, is provided to the second input 307. In a third step, the piston 302 is actuated from the first position to the second position.

Although the valve described herein could be applied to any engine fuel system, it may be optimally realised in an aero-engine fuel staging system where there are specific requirements associated with mains fuel flow scheduling and shut-off.

It will be understood that the invention is not limited to the embodiments above-described and various modifications and improvements can be made without departing from the concepts herein. Except where mutually exclusive, any of the features may be employed separately or in combination with any other features and the disclosure extends to and includes all combinations and sub-combinations of one or more features described herein.

The invention claimed is:

1. A staging fuel valve, comprising:
   a valve housing having a first fuel inlet, a second fuel inlet, a first fuel outlet, and a second fuel outlet;
   a piston slidably mounted within a chamber in the valve housing and being moveable between a first position in which the first fuel inlet is in fluid communication with the first fuel outlet while the second fuel inlet and second fuel outlet are blocked, and a second position in which the second fuel inlet is in fluid communication with the second fuel outlet;
   wherein the piston comprises a magnet assembly and the valve housing comprises a coil arranged to provide, when energized, a magnetic force to actuate the piston between the first and second positions, and
   wherein the piston comprises a tapered head section arranged to align with the second fuel inlet when the piston is partially actuated between the first and second positions such that a pressure of fuel flow from the second inlet tends to cause the piston to further actuate towards the second position.

2. The staging fuel valve of claim 1, wherein the first fuel inlet is in fluid communication with the first fuel outlet when the piston is in the second position.

3. The staging fuel valve of claim 1, wherein the tapered head section of the piston comprises a conical or a frusto-conical shape.

4. The staging fuel valve claim 1, further comprising a controller having output connections connected across the coil, the controller configured to provide a current through the coil to actuate the piston in response to an input signal.

5. The staging fuel valve of claim 4, wherein the controller is configured to provide a current pulse in response to the input signal to actuate the piston from the first position to the second position.

6. The staging fuel valve of claim 4, wherein the controller is configured to provide a continuous current through the coil to maintain the piston in the second position.

7. A method of operating a staging fuel valve according to claim 1, the method comprising sequential steps of:
   providing a first fuel flow at a first pressure to the first fuel inlet with the piston in the first position;
   providing fuel at a second pressure higher than the first pressure to the second input; and
   actuating the piston from the first position to the second position.

8. The method of claim 7, wherein the step of actuating the piston comprises applying an actuation current through the coil to provide the magnetic force to actuate the piston towards the second position.

9. The method of claim 8, wherein the step of applying the actuation current comprises applying a current pulse through the coil.

10. The method of claim 9, further comprising the subsequent step of applying a maintaining current, lower than the actuation current, to maintain the piston in the second position after actuation to the second position.

11. The method of claim 8, further comprising the subsequent step of applying a maintaining current, lower than the actuation current, to maintain the piston in the second position after actuation to the second position.

* * * * *